(12) United States Patent
Ehrenleitner et al.

(10) Patent No.: US 6,673,153 B2
(45) Date of Patent: Jan. 6, 2004

(54) TREATMENT PLANT, IN PARTICULAR FOR PAINTING OBJECTS, IN PARTICULAR VEHICLE BODIES

(75) Inventors: Franz Ehrenleitner, Stuttgart (DE); Hans-Joachim Weinand, Ditzingen (DE)

(73) Assignee: Eisenmann Maschinenbau GK (DE)

( * ) Notice: Subject to any disclaimer, the term of this patent is extended or adjusted under 35 U.S.C. 154(b) by 0 days.

(21) Appl. No.: 10/220,687

(22) PCT Filed: Nov. 16, 2001

(86) PCT No.: PCT/EP01/13289

§ 371 (c)(1),
(2), (4) Date: Sep. 4, 2002

(87) PCT Pub. No.: WO02/053482

PCT Pub. Date: Jul. 11, 2002

(65) Prior Publication Data

US 2003/0089312 A1 May 15, 2003

(30) Foreign Application Priority Data

Jan. 5, 2001 (DE) .......................................... 101 00 377

(51) Int. Cl.[7] ................................................. D05C 3/00
(52) U.S. Cl. ......................... 118/423; 118/416; 104/94
(58) Field of Search ................... 104/94, 243; 105/155; 198/346.3, 375, 377.02; 134/116; 118/416, 423, 425, 426, 500; 204/198, 199, 479, 625

(56) References Cited

FOREIGN PATENT DOCUMENTS

| DE | 30 24 195 C2 | 4/1982 |
|----|----|----|
| DE | 40 41 211 C1 | 1/1992 |
| DE | 196 41 048 C2 | 7/2000 |
| FR | 2 581 977 | 11/1986 |
| JP | 05193715 A | 8/1993 |

*Primary Examiner*—Brenda A. Lamb
(74) *Attorney, Agent, or Firm*—Factor & Partners (57) ABSTRACT

An installation for painting objects, in particular vehicle bodies, has at least one bath containing a treatment fluid in which the objects are to be immersed. The objects are guided through the installation in a continuous or intermittent translatory movement with the aid of a conveyor device. A plurality of immersion devices is provided, which support the objects with the aid of a supporting structure. The latter is connected to the conveyor device by way of a connecting structure. Each connecting structure has at least one steering linkage which in turn comprises two steering components arranged at a distance from one another. The steering components are each rotatably connected to the conveyor device at one end and rotatably connected to the supporting structure at the other end. At least one device ensures that at least one of the two steering components of the steering linkage can be rotated about the axis produced by its articulated connection to the conveyor device. It is possible for very different kinematics of the immersion and removal movement to be realized with the aid of the immersion device described, including those movements in which the object is lowered in parallel alignment with its original orientation and those in which the object is rotated about a horizontal axis

6 Claims, 9 Drawing Sheets

TREATMENT PLANT, IN PARTICULAR FOR PAINTING OBJECTS, IN PARTICULAR VEHICLE BODIES

The invention relates to an installation for treating, in particular for painting, objects, in particular vehicle bodies, having a) at least one bath in which there is a treatment fluid, in particular paint, in which the objects are to be immersed;

b) a conveyor device by means of which the objects can be guided through the installation in a continuous or intermittent translatory movement;

c) a plurality of immersion devices which each support an object on a supporting structure connected to the conveyor device by way of a connecting structure and are able to immerse this object in the bath.

An installation of this type is described in DE 196 41 048 C2. In this, the immersion devices are constructed such that the objects to be treated—in the exemplary embodiment illustrated, vehicle bodies to be painted—are immersed in the baths and lifted out of these again with a superimposition of the translatory movement and a rotary movement about an axis aligned perpendicularly to the transport direction. Here, the connecting structures of these immersion devices are inherently rigid holding frames, a single axis of rotation for the rotary movement being located in the lower middle region thereof, as seen in the normal position. The purpose of this installation is to enable the objects to be treated to be completely immersed in the baths along a relatively short path of the translatory movement, so that the end walls of the baths can be steep and the baths as a whole can be short. The disadvantage is that the objects to be treated have to be placed completely "on their head". In the case of objects which have a considerable weight, this calls for very expensive holding frames and large forces. If the objects to be treated are vehicle bodies, their movable parts, for example doors, boots and bonnets, have to be secured against swinging open. Moreover, kinematically speaking, these known immersion devices permit only one type of immersion movement, that is the rotary movement, which is not optimal for many objects which have unfavourable geometries for this.

The object of the present invention is to further develop an installation of the type mentioned at the outset, such that, whilst using substantially equally short baths, it is not necessary to rotate the objects to be treated through 180° and it is possible to devise the kinematics of the immersion procedure such that they may be more varied. This object is achieved according to the invention in that d) the connecting structure has at least one steering linkage which in turn comprises:

da) two steering means which are arranged at a distance from one another and are connected in articulated manner to the conveyor device at one end and in articulated manner to the supporting structure at the other end;

db) at least one device by means of which at least one of the two steering means of the steering linkage can be rotated about the axis produced by its articulated connection to the conveyor device.

According to the invention, therefore, a steering linkage is used within the connecting structure which has each immersion device, said steering linkage enabling precise guidance of the objects to be treated, even in their orientation with respect to the horizontal. Key factors here are two steering means which are arranged at a distance from one another and connect the conveyor device to the supporting structure. If at least one of these steering means is rotated about the axis of articulation, which corresponds to its articulated connection to the conveyor device, the entire steering linkage follows with kinematics which correspond in detail to the design of this steering linkage. In each case, the point at which the rotatable steering means is connected to the supporting structure in articulated manner can be moved by a vertical difference which corresponds to double the length of this steering means.

In the simplest case, both steering means of the steering linkage are rigid one-piece parts. The steering linkage thus forms a type of parallelogram guide, in which two sides of the parallelogram are formed by the two steering means, one side by the conveyor device and one side by the supporting structure. If at least one of the two steering means is rotated, for example by a motor, the height of the parallelogram alters; the object held by the supporting structure passes through a vertical movement, which can be either an immersion or a removal movement. During this, the object itself maintains its original orientation with respect to the horizontal. The direction and speed with which the steering means is rotated can be matched to the translatory movement of the entire immersion device such that the object is immersed in, or lifted out of, the bath in virtually vertical manner.

A much more variable embodiment of the invention is the particularly preferred embodiment in which one of the two steering means of the steering linkage comprises two steering elements which are movably connected to one another, and in which, associated with both steering means, there is in each case a device by means of which the particular steering means can be rotated about the axis produced by its articulated connection to the conveyor device independently of the other steering means.

This embodiment of the invention enables a plurality of kinematics for immersing and removing the objects in and out of the baths. As a result of one of the two steering means being composed of two steering elements which are movably connected to one another, the two steering means can, to a certain extent, be rotated independently of one another. This means in particular that the vertical movement of the objects to be treated can now be linked in virtually any manner with a rotary movement about a horizontal axis. The vertical and rotary movements are completely independent of one another and are furthermore also independent of the translatory movement which the objects execute through the conveyor device. The selected kinematics can be adapted in optimum manner to the particular geometry of the objects to be treated. In the case of vehicle bodies, for example, the immersion procedure can be devised to ensure an optimum flow along the various inner and outer faces and also good ventilation of the inner cavities.

The two steering elements of the one steering means can be mutually connected in articulated—although preferably linearly displaceable—manner. In both cases, they give the corresponding steering means the degree of freedom necessary for its independent rotation.

The connecting structure expediently has two steering linkages of the type described above, which are arranged at a mutual parallel spacing. In this case, the movement of the two steering linkages is synchronised in suitable manner.

It is particularly favourable here when the two steering linkages are arranged parallel to the transport direction of the conveyor device. In this case, all those components which belong to the conveyor technology can be located to the side of the baths, so that these latter cannot be contaminated by impurities falling or dropping down from the conveyor technology.

An exemplary embodiment of the invention is explained in more detail below with reference to the drawing, which shows

Figure 1:
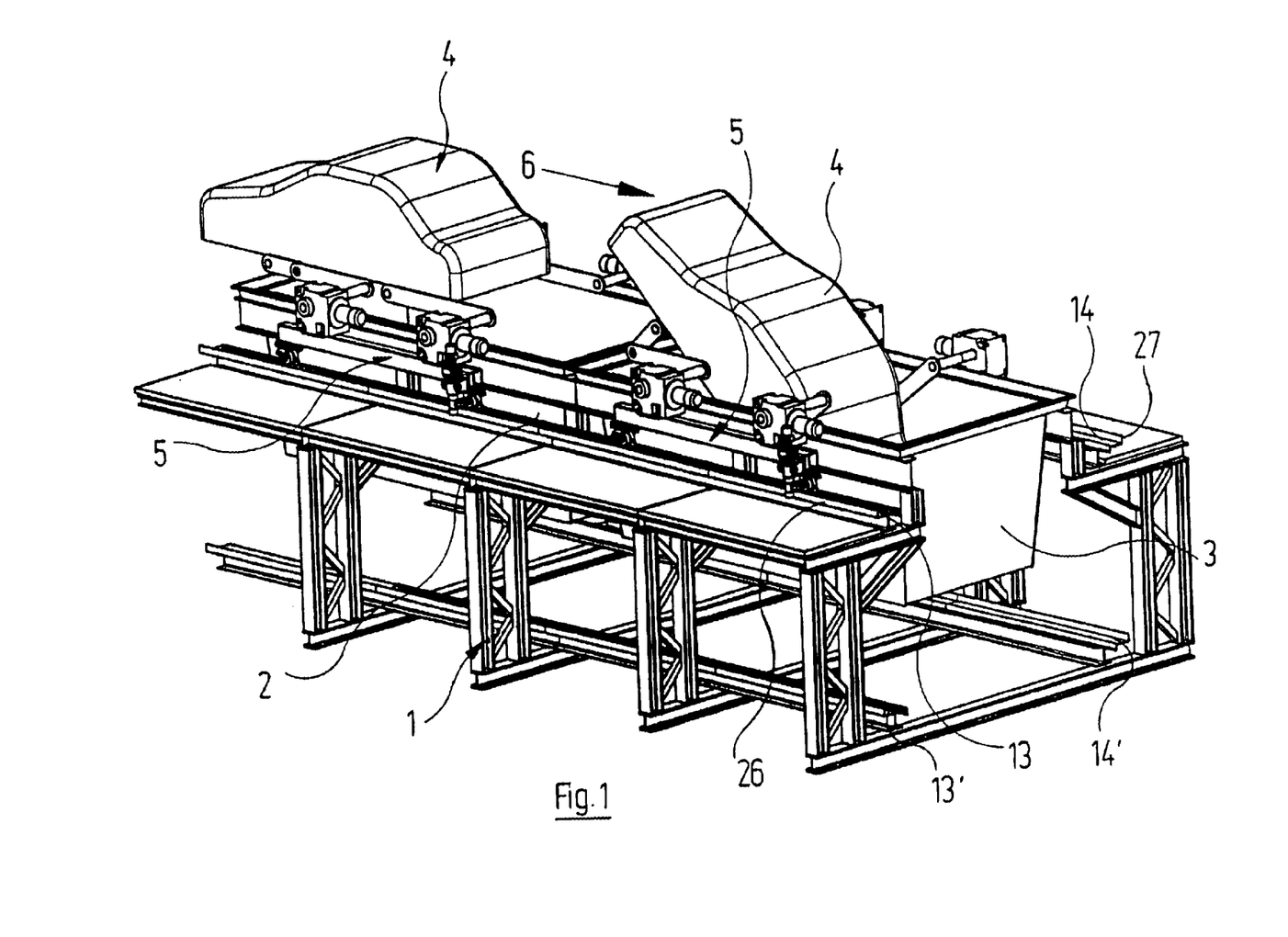
FIG. 1: a perspective detail of an immersion painting installation for vehicle bodies.

The immersion painting installation for vehicle bodies which is illustrated in the drawing has a steel construction 1 which has a plurality of vertical stands and horizontal supports and in which two bath containers 2, 3 are suspended. The bath containers 2, 3 are filled to a certain level with liquid paint in which vehicle bodies 4 are to be immersed. To this end, these vehicle bodies 4 are transported in the direction of the arrow 6 (c.f. FIG. 1) with the aid of individual transport carriages 5, it being possible for the individual transport carriages 5 to effect this translatory movement independently of one another and to be subjected to decelerations, accelerations, stops and even reverse movements in the course of these independent movements. Overall, however, the vehicle bodies 4 are transported in the direction of the arrow 6 in FIG. 1.

The precise construction of the transport carriages 5 is illustrated in more detail in FIGS. 4 to 9. As shown in particular in FIG. 6, each transport carriage 5 has two longitudinal cross rails 7, 8, on the underside of which there are mounted in each case two double wheels, 9, 10 and 11, 12 respectively, which are rotated about a horizontal axis. Additionally, the wheels 9 to 12 may be rotated in each case about a vertical axis with the aid of a swivelling bolster (not illustrated in detail), so that the alignment of the double wheels 9 to 12 can be altered with respect to the particular longitudinal cross rails 7, 8.

Figure 2:
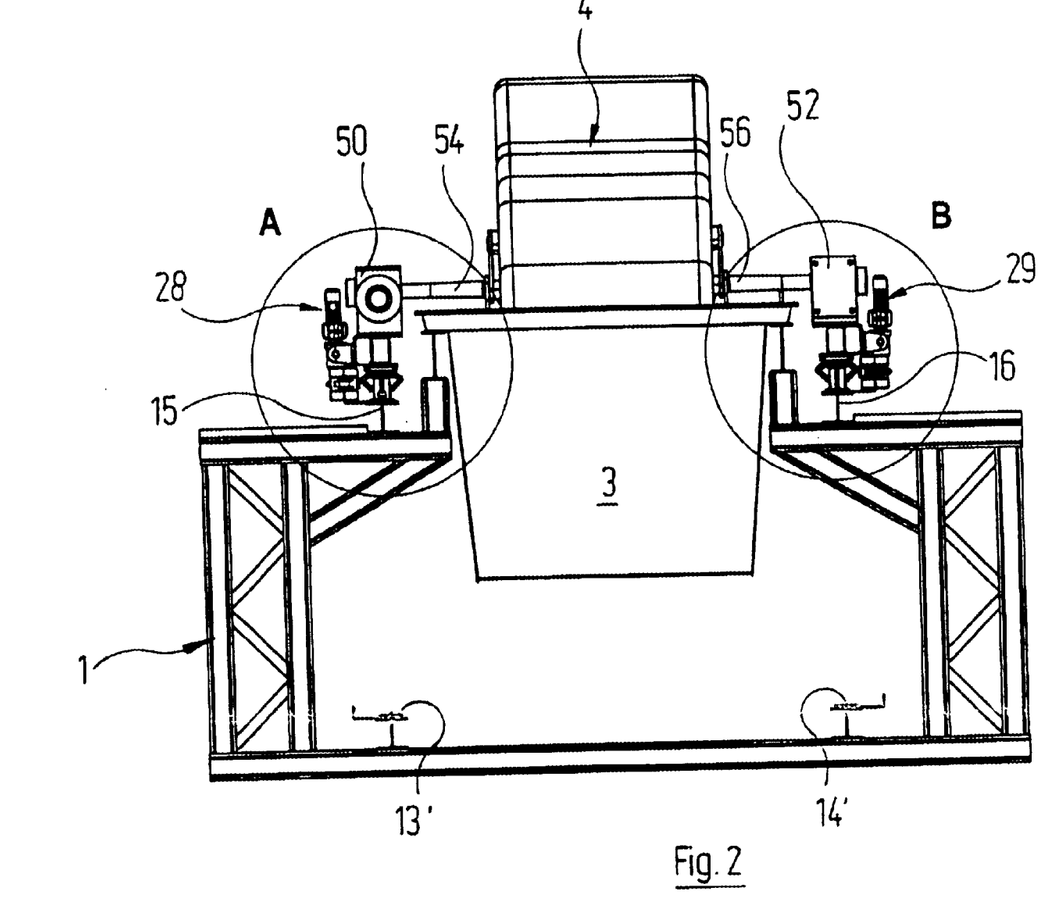
FIG. 2: a section through the installation of FIG. 1, perpendicular to the movement direction of the vehicle bodies, as viewed from below from the right.
Figure 3:
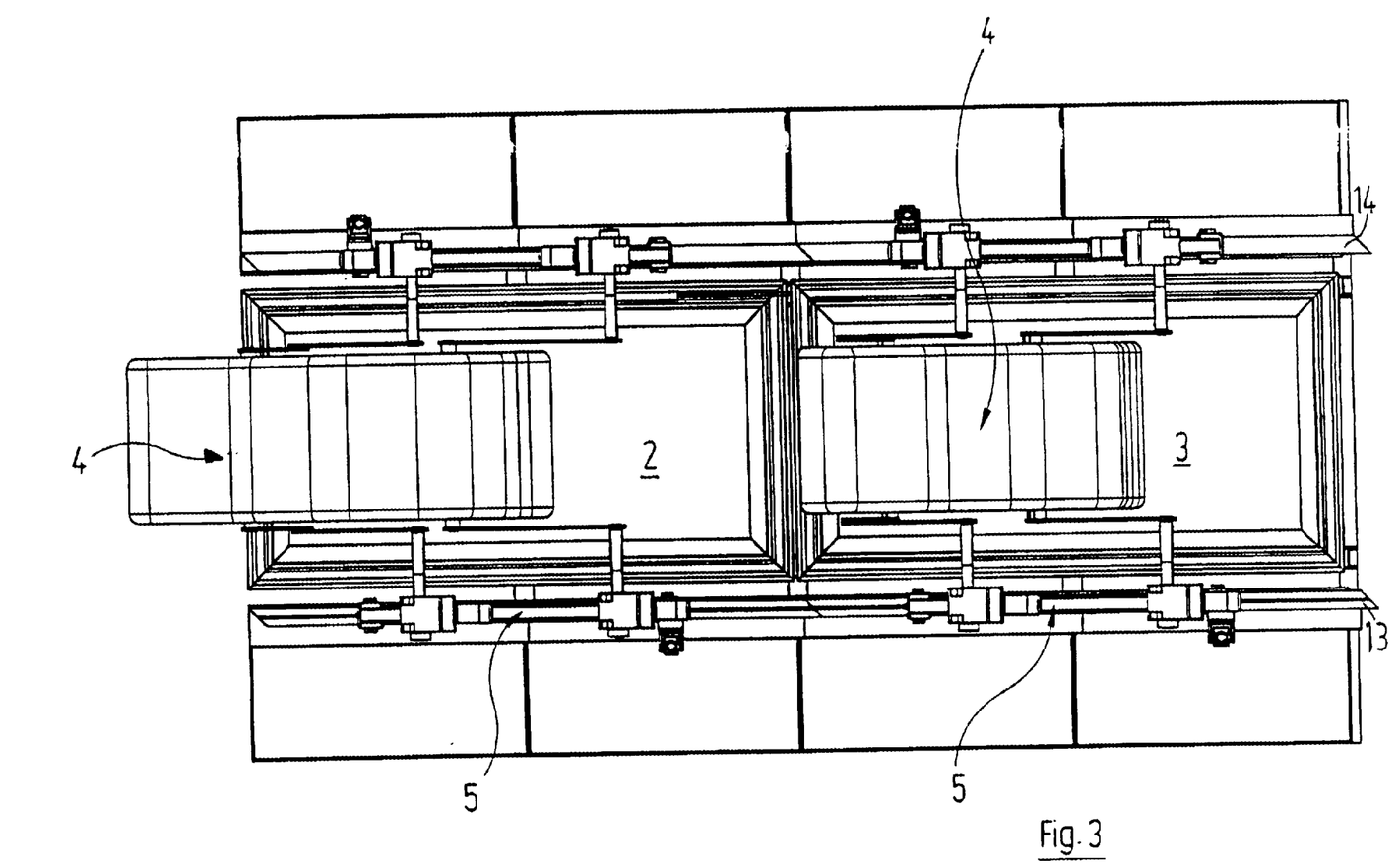
FIG. 3: a plan view of the installation of FIG. 1.
Figure 4:
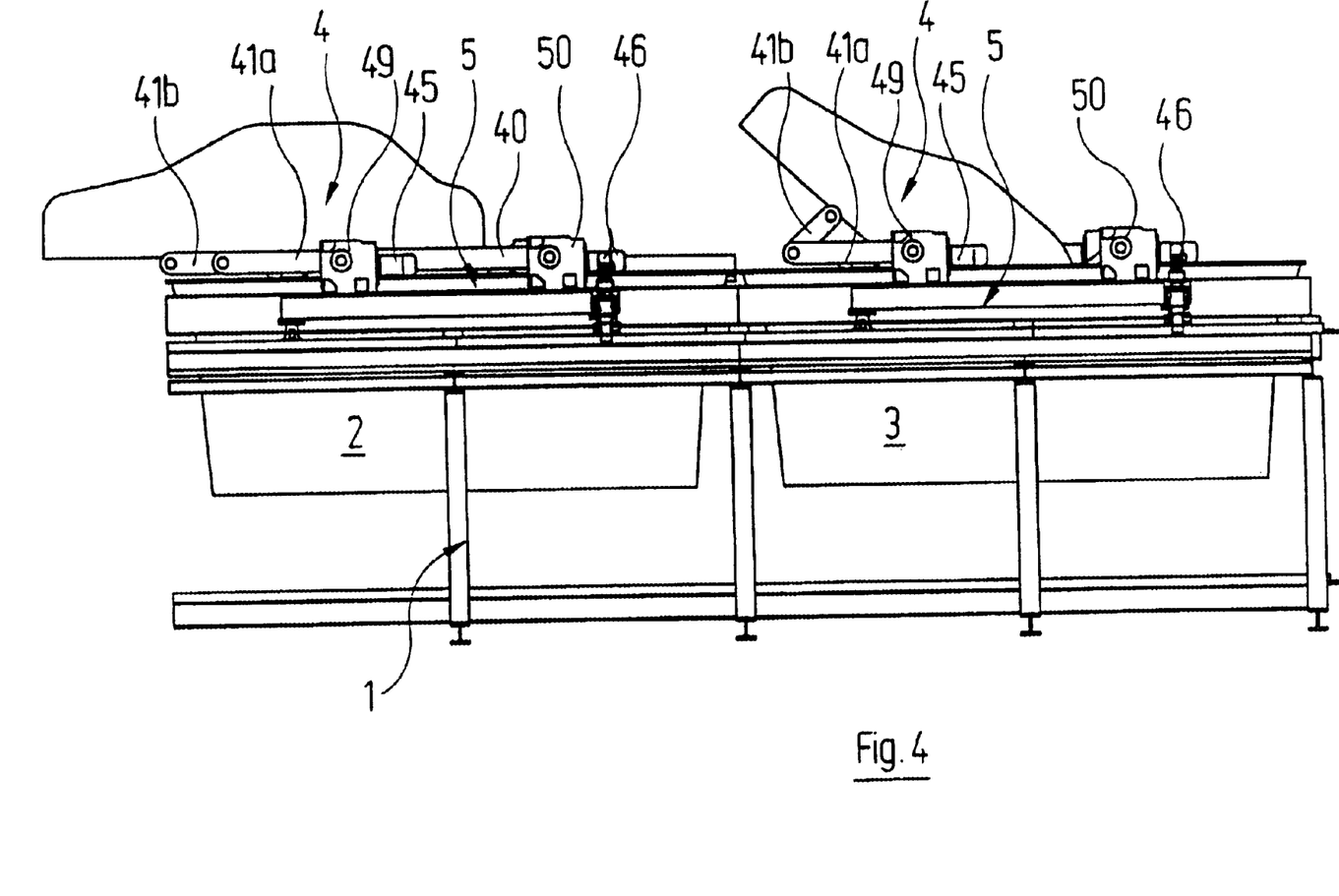
FIG. 4: a side view of the detail of the painting installation of FIG. 1.

The double wheels 9, 10 roll along a first running face 13 and the double wheels 11, 12 roll along a second running face 14 parallel thereto. The running faces 13, 14 are in turn mounted in each case on a respective I-profile support 15, 16 which is supported by the steel construction 1 (c.f. in particular FIG. 2).

Figure 6:
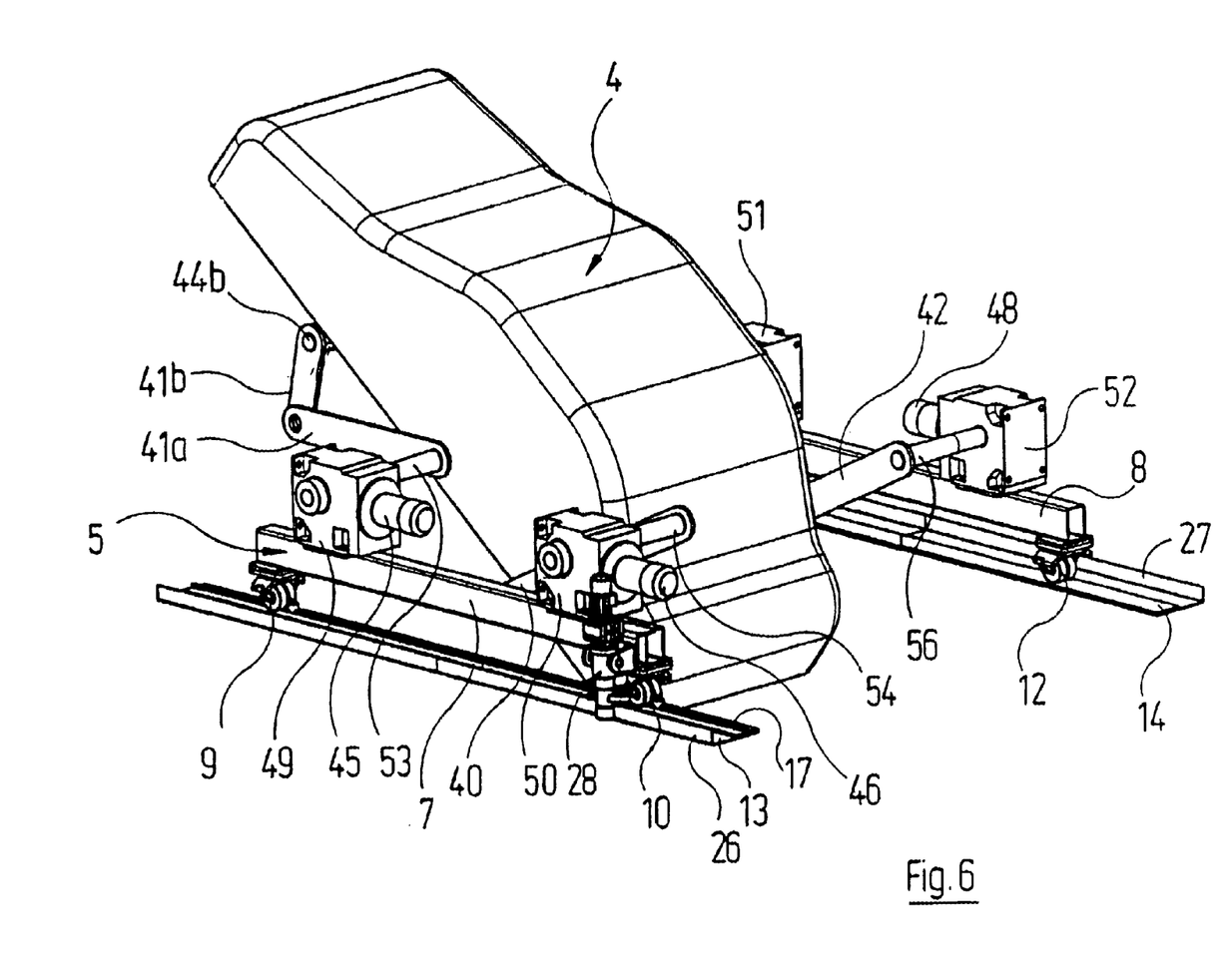
FIG. 6: a perspective view of the transport carriage including the vehicle body of FIG. 5.
Figure 8:
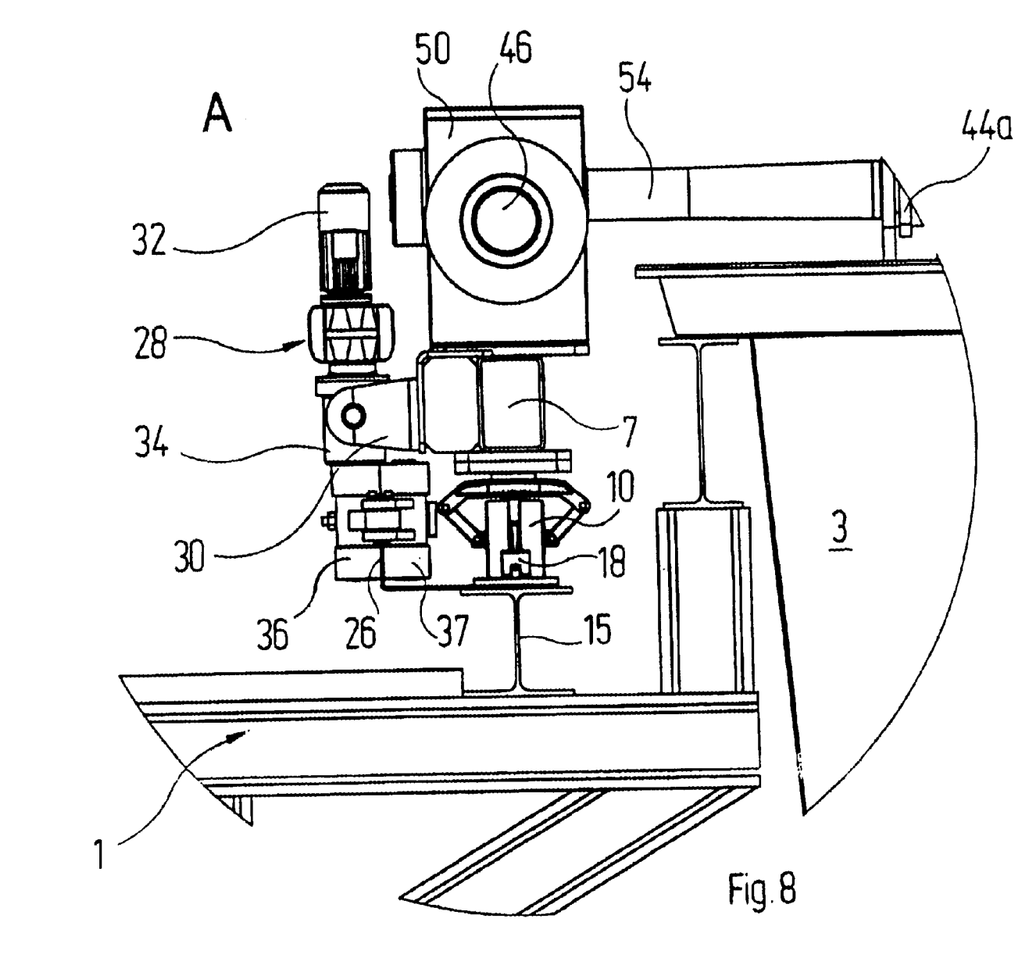
FIG. 8: an enlarged detailed view in the region of the circle characterised by the letter A in FIG. 2.
Figure 9:
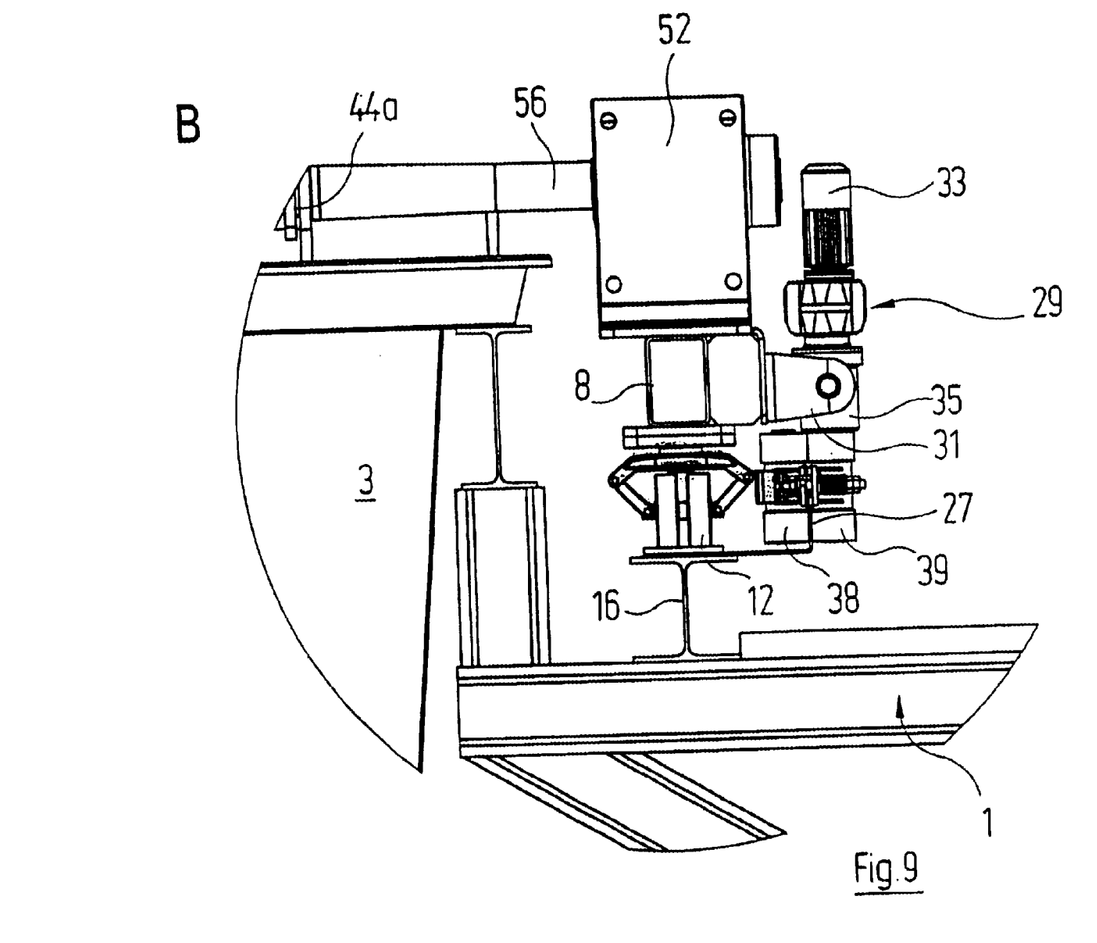
FIG. 9: an enlarged detailed view in the region of the circle characterised by the letter B in FIG. 2.

Mounted in the centre of the lower first running face 13, as seen in FIG. 6, there is a guide rib 17 which is covered by guide elements 18 (c.f. FIG. 8) having a complementary cutout. One guide element 18 is connected in each case to the swivelling bolster of an associated double wheel 9 or 10 such that it rotates this double wheel 9 or 10 about the vertical axis according to the course of the guide rib 17. The double-wheels 9, 10 thus follow the first running face 13. On the other hand, the double wheels 11, 12 associated with the second upper running face 14, as seen in FIG. 6, are designed as simple trailing wheels, i.e. no separate guide means are provided for influencing the angular position of the wheels about their vertical axis of rotation. It is thus possible to place little demand on the precision of the guide means holding the transport carriages 5 on the running faces 13, 14.

Figure 5:
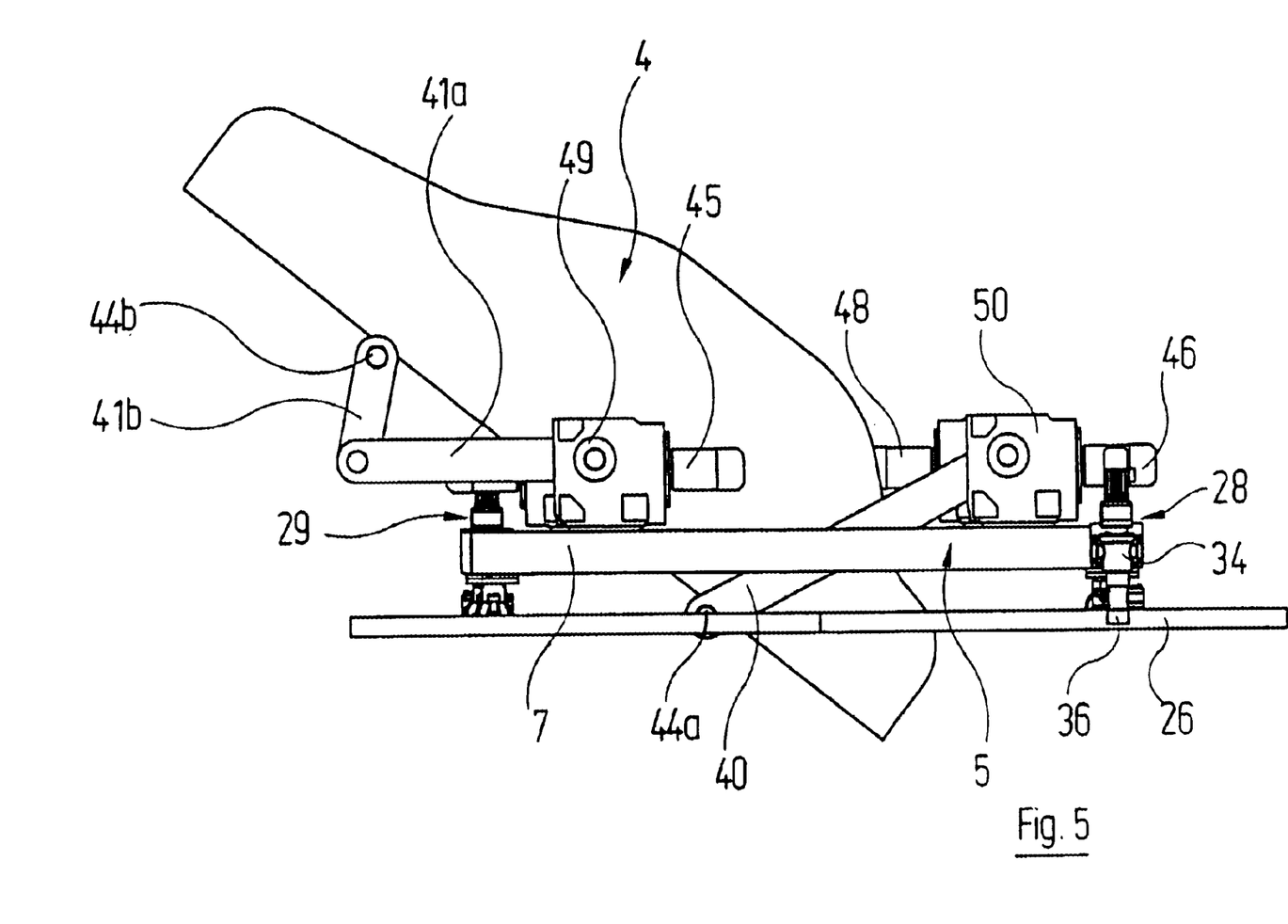
FIG. 5: a side view of a transport carriage which is used in the painting installation, having a vehicle body fixed thereto.
Figure 7:
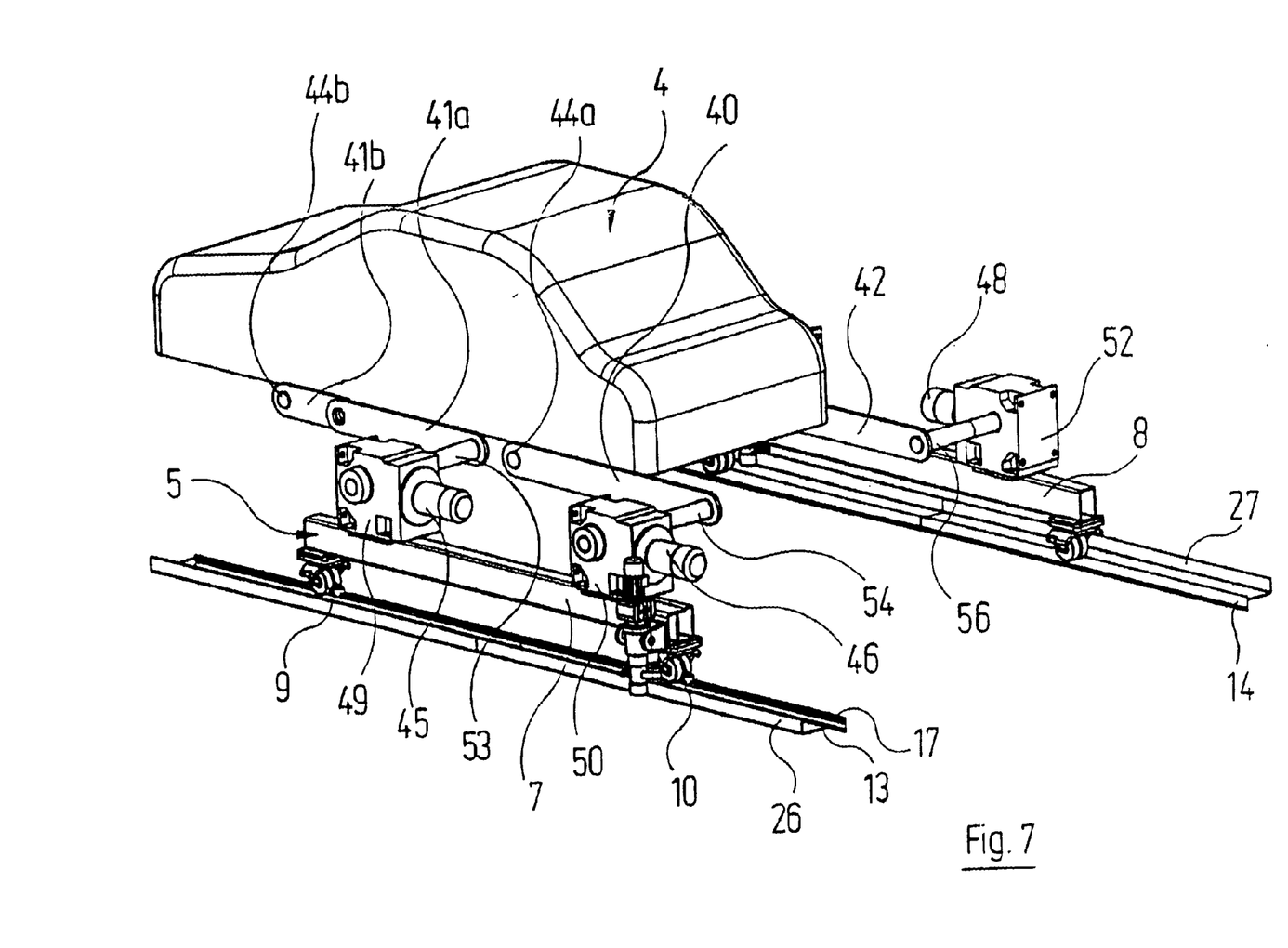
FIG. 7: a view similar to FIG. 6, albeit with the vehicle body located in its normal transport position on the transport carriage.

The vehicle bodies 4 are supported on the transport carriages 5 with the aid of an immersion device, which has a steering linkage on each side of the vehicle bodies 4. Each of these steering linkages has a front steering means 40, as seen in the movement direction, and a rear steering means 41, as seen in the movement direction. The front steering means 40 of the front steering linkage, as seen in FIGS. 5 to 7, is connected in articulated manner by one end to a front transverse cross rail 44*a*, which extends through below the vehicle body 4 until it reaches the corresponding end of the front steering means 42 of the rear steering linkage, as seen in these Figures. The other end of the two front steering means 40, 42 is rigidly connected in each case to the output shaft 54, 56 of a respective gear block 50 or 52, to which a respective electric motor 46 or 48 is flanged in each case. As a result of applying a current to the electric motors 46, 48, it is thus possible to alter the angular position of the two front steering means 40, 42, which are in mutually parallel alignment, and thus the vertical position of the vehicle body 4 at the point of the front transverse cross rail 44*a*.

The rear steering means 41, 43 of the two steering linkages are composed in each case of two steering elements 41*a*, 41*b*, which are mutually connected in articulated manner. The second end of the one steering element 41*a* or 43*a* of the two rear steering means, 41 and 43 respectively, is in turn rigidly connected to a respective output shaft 53 or 55 of a respective gear block 49 or 51, to which a respective electric motor 45 or 47 is likewise flanged in each case. The steering elements 41*a*, 41*b* of the steering linkage again extend along the one side of the vehicle body 4, parallel to the corresponding steering elements 43*a* and 43*b* of the steering linkage on the other side of the vehicle body 4.

The two transverse cross rails 44*a*, 44*b* together form a supporting structure for the vehicle body 4; they can be mutually connected by an additional longitudinal cross rail (not illustrated in the drawing).

The double wheels 9 to 12 of the transport carriages 5 are themselves not driven. The transport carriages 5 are instead advanced by way of a separate drive which will be explained in more detail below with reference to FIGS. 6 to 9.

Two vertically aligned, stationary drive flanges 26, 27 extend parallel to the two running faces 13, 14, These drive flanges cooperate in each case with a pressure roller drive, 28 and 29 respectively, which is fixed to the side face of the adjacent longitudinal cross rail 7, 8 by means of a respective clip 30 or 31. The pressure roller drives 28, 29 each have an electric drive motor 32, 33 and a drive gear 34, 35. The latter drives the parallel vertical axes of two pressure rollers 36, 37 or 38, 39, which are pressed from both sides against the respectively associated drive flange 26 or 27. If a current is applied to the drive motors 32, 33, the pressure rollers 36, 37 or 38, 39 run along the respective side faces of the drive flanges 26, 27 and thereby move the transport carriage 5 forwards along the running faces 13, 14.

Each transport carriage 5 has its own carriage control, which governs both its translatory movement along the running faces 13, 14 and the immersion movement of the vehicle bodies 4.

The immersion painting installation described above functions as follows:

The vehicle bodies 4 to be painted are each placed on a separate transport carriage 5 and thus supplied in succession to the baths 2, 3. Once the leading end of a vehicle body 4 has reached the start of the first bath 2, as seen in the transport direction 6, the carriage control decides whether this vehicle body 4 is to be immersed in this bath 2. If this is confirmed, the immersion procedure is initiated. This can take place in kinematically very varied manners with the aid of the two steering linkages. An example of this is illustrated in FIGS. 5 to 7.

Reference is first of all made to FIG. 7. In this, both the front steering means 40, 42 and the rear steering means 41, 43 of the two steering linkages are horizontal; thus the supporting structure having the two transverse cross rails 44a, 44b, and the vehicle body 4 held thereby, are also horizontal. This is the position in which the vehicle bodies 4 are moved outside the baths 2, 3. In FIGS. 5 and 6, as a result of applying a corresponding current to the motors 46, 48, the front steering means 40, 42 of the two steering linkages have now been rotated somewhat in an anticlockwise direction with respect to the "normal position" illustrated in FIG. 7, whilst the position of the steering elements 41a, 43a belonging to the rear steering means 41, 43 has remained unaltered. The second steering elements 41b, 43b belonging to the rear steering means, 41 and 43 respectively, are forced to pivot upwards in a clockwise direction during this procedure, since the spacing between the transverse cross rails 44a, 44b naturally remains constant.

This amounts substantially to a rotation of the vehicle body 4 about a substantially horizontal axis.

Completely different movement kinematics can be achieved if the angular position not only of the front steering means 40, 42, but at the same time of the rear steering means 41, 43, is altered by the corresponding electric motors 45, 47. The movement possibilities range from a movement guidance of the vehicle bodies 4, which corresponds to that of a parallelogram guidance, to very different forms of the superimposition of a translatory and a rotary movement. Here, the front steering means 40, 42 and the rear steering means 41, 43 can be rotated independently of one another to the extent that the rear steering elements 41b, 43b provide the necessary compensation. Both the rotation of the front steering means 40, 42 and also that of the rear steering means 41, 43 is moreover completely independent of the translatory movement executed in the transport direction 6 by the individual transport carriages 5 on which the vehicle bodies 4 are held.

The translatory movement of the transport carriage 5 can be decelerated or stopped as desired when the vehicle body 4 is immersed, and the vehicle body 4 can be subjected to a rocking motion in that a corresponding current is applied to the electric motors 45 to 48. After the desired residence time in the bath 2, the vehicle body 4 is lifted out of the bath 2 again as a result of actuating the electric motors 45 to 48, which can again occur in accordance with very special kinematics, which do not need to be similar to the kinematics of the immersion procedure.

If required, the vehicle body 4 can be brought into different angular positions above the bath 2 as a result applying corresponding currents to the electric motors 45 to 48, in order to enable the paint to completely run out and drip off into the associated bath 2 and thus minimise entrainment of the paint. Then, as a result of actuating the pressure roller drives 28, 29, the translatory movement of the transport carriage 5 is initiated again, if necessary at a higher speed, until the vehicle body 4 has reached the second bath 3, as seen in the movement direction. It is possible for the procedures carried out here to be the same as those described for the first bath 2.

In certain painting installations, different vehicle bodies 4 following one another have to be treated in different manners. This is readily possible using the painting installation described. For example, a bath 2, 3, can be passed over completely; the vehicle body 4 can also be immersed in the particular bath 2, 3 using a combined rotary and translatory backward movement.

Since, as mentioned, successive vehicle bodies 4 can be treated in different manners in the baths 2, 3, it is possible to set different spacings between successive transport carriages 5. These different spacings can be made uniform again as desired by accelerating or decelerating successive transport carriages 5 accordingly.

Located at the start of the painting installation, there is a delivery station (not illustrated) where the individual vehicle bodies 4 are placed on a stationary transport carriage 5 and are fixed thereto. In corresponding manner, located at the end of the painting installation, there is a removal station where the vehicle bodies 4 are removed from a stationary transport carriage 5. Both the delivery and the removal station are constructed as lifting stations. In the removal station, the empty transport carriage 5 is lowered until the running faces 13, 14, which also continue into the removal station, are in alignment with parallel running faces 13', 14' which extend back to the delivery station in a lower level of the steel construction 1. In opposition to the direction of the arrow 6, the empty transport carriages 5 are brought back along these running faces 13', 14' below the baths 2, 3 to the delivery station, which can take place at relatively high speed. In the delivery station, the transport carriages 5 are brought back to the level of the upper running faces 13, 14 and, as described above, are equipped with new vehicle bodies 4 to be painted.

It goes without saying that the transport carriages 5 can also be brought back to the inlet of the installation in some other manner.

As is revealed in particular in FIG. 1, all of the components of the conveyor technology of the described painting installation are located to the side of the baths 2, 3 so that the liquids located in the baths 2, 3 cannot be contaminated by these components of the conveyor technology.

In the exemplary embodiment described above and illustrated in the drawing, the rear steering means 41, 43 of the transport carriages 5 are composed in each case of two steering elements 41a, 41b, 43a, 43b, which are mutually connected in articulated manner. In one embodiment of the invention (not illustrated), the degree of freedom required for the independent rotatability of the rear steering means is ensured as a result of the corresponding steering means having two steering elements which are mutually connected in linearly displaceable manner such that these steering means can alter their effective length.

What is claimed is:

1. An installation for treating, in particular for painting, objects, in particular vehicle bodies, having:
   a) at least one bath in which there is a treatment fluid, in particular paint, in which the objects are to be immersed;
   b) a conveyor device by means of which the objects can be guided through the installation in a continuous or intermittent translatory movement;
   c) a plurality of immersion devices which each support an object on a supporting structure connected to the conveyor device by way of a connecting structure and are able to immerse this object in the bath, characterized in that;
   d) the connecting structure has at least one steering linkage which in turn comprises:

da) two steering means which are arranged at a distance from one another and are connected in articulated manner to the conveyor device at one end and in articulated manner to the supporting structure at the other end;
db) at least one device by means of which at least one of the two steering means of the steering linkage can be rotated about an axis produced by its articulated connection to the conveyor device.

2. An installation according to claim 1, characterized in that one of the two steering means of the steering linkage comprises two steering elements which are movable relative to one another, and in that, associated with both steering means, there is in each case a device by means of which the particular steering means can be rotated about the axis produced by its articulated connection to the conveyor device independently of the other steering means.

3. An installation according to claim 2, characterized in that the two steering elements are mutually connected in articulated manner.

4. An installation according to claim 2, characterized in that the two steering elements are mutually connected in linearly displaceable manner.

5. An installation according to claim 1, characterized in that the connecting structure has two steering linkages, which are arranged at a distance from one another and parallel to one another.

6. An installation according to claim 5, characterized in that the two steering linkages are arranged parallel to a transport direction of the conveyor device.

* * * * *